United States Patent [19]
Ferrari

[11] 3,881,114
[45] Apr. 29, 1975

[54] ELECTRONIC SEQUENCER
[76] Inventor: Rodolfo D. Ferrari, 1370-F Logan Ave., Costa Mesa, Calif. 92626
[22] Filed: Sept. 11, 1973
[21] Appl. No.: 396,199

[52] U.S. Cl. ............................................. 307/41
[51] Int. Cl. .......................................... H02j 3/00
[58] Field of Search .......... 307/41, 38, 39, 40, 141, 307/141.4, 141.8

[56] References Cited
UNITED STATES PATENTS
3,379,893  4/1968  Cavanaugh ......................... 307/41

*Primary Examiner*—Herman F. Hohauser
*Attorney, Agent, or Firm*—Herbert E. Kidder

[57] ABSTRACT

The present invention relates to an electronic sequencer; and more particularly relates to a sequencing system comprised of identical modules that are interconnected in such a way that the modules are turned on in a given predetermined sequence to energize given loads connected to those modules. Adjustable delay intervals are introduced to permit selected loads to be turned on for predetermined durations. Various safety devices, such as panic buttons, hold switches, supervisory controls, etc., may be added as needed.

13 Claims, 3 Drawing Figures

ELECTRONIC SEQUENCER

BACKGROUND OF THE INVENTION

It is well recognized that the tremendous advances of our technically oriented society are due, to a great extent, to the development of semiautomatic and automatic machinery and processes; that is, a workpiece or a material advances automatically from one operation to another in a specific sequence and at predetermined times. In some cases the operations may be simple, and may have a simple relationship, — e.g., drilling and tapping a hole in a workpiece; cutting and shaping a piece of sheet metal; etc. In other cases, the operations may be complex, and may have a complex interrelationship, — e.g., automatically producing an automotive engine; controlling a chemical process as to mixtures, timing, heating; etc. It is characteristic that ever-more-complex operations and relationships are becoming necessary.

In the past, the simple requirements were satisfied by the use of primarily mechanical devices such as cams, rotating timers, pressure transducers, and the like; and their relationship permitted relatively simple interconnections. Eventually, more complex electromechanical apparatus and electronic circuitry were adopted.

Most control systems were specifically designed for a particular function by an individual with specific expertise in a given field; but the systems were usually modified by the manufacturer of the hardware, and were further modified by the installer and the maintenance men. Thus, by the time the system had aged appreciably, trouble-shooting and maintenance required special skills.

There is a growing trend toward the use of electronic control systems; but, unfortunately, it requires the services of an extremely skilled expert to design and maintain such an electronic control system.

Thus, it will be realized that there is a tremendous need for an electronic control system that is easy to design, and has high reliability and relatively low cost. Moreover, it should have a wide flexibility, so that it may readily be redesigned for short runs, and as needed.

SUMMARY OF THE INVENTION

It is therefore the primary object of the present invention to provide an improved sequence control system.

It is another object of the present invention to provide an improved electronic sequencing system that is easy to design.

It is still another object of the present invention to provide an electronic sequencing system that it is easy to maintain.

It is a further object of the invention to provide an electronic sequencing system capable of performing many types of functions and controls.

It is a still further object of the invention to provide an improved electronic sequencing system that is flexible in use and design.

It is a still further object of the invention to provide an improved electronic sequencing system that is relatively economical.

Attainment of these objects, and others, will be realized from a study of the following specification, taken in conjunction with the accompanying drawings.

SYNOPSIS

Broadly speaking, the present invention comprises a series of identical electronic modules that are turned on in a predetermined sequence; each module energizing the load connected to it, turning off the preceding module, and activating its subsequent module — the delay interval of the subsequent module determines the duration of the time that the load is energized. The system may comprise means for an operator to start and terminate the operation, means for causing he sequencer to recycle repeatedly and automatically, means for causing the system to act in a semi-automatic manner, or to act in a manually controlled manner, means for producing panic or dead-man termination of operation, means for providing supervisory start-up control after power failure; etc.

DISCLOSURE OF THE INVENTION

For ease of comprehension, the following presentation will first disclose and explain the circuitry and operation of an individual electronic module that is used as a basis for thr present invention; so that its operation and capabilities may be fully understood. After this, a discussion will show the use of a plurality of such modules in the disclosed sequencing system.

Figure 1:
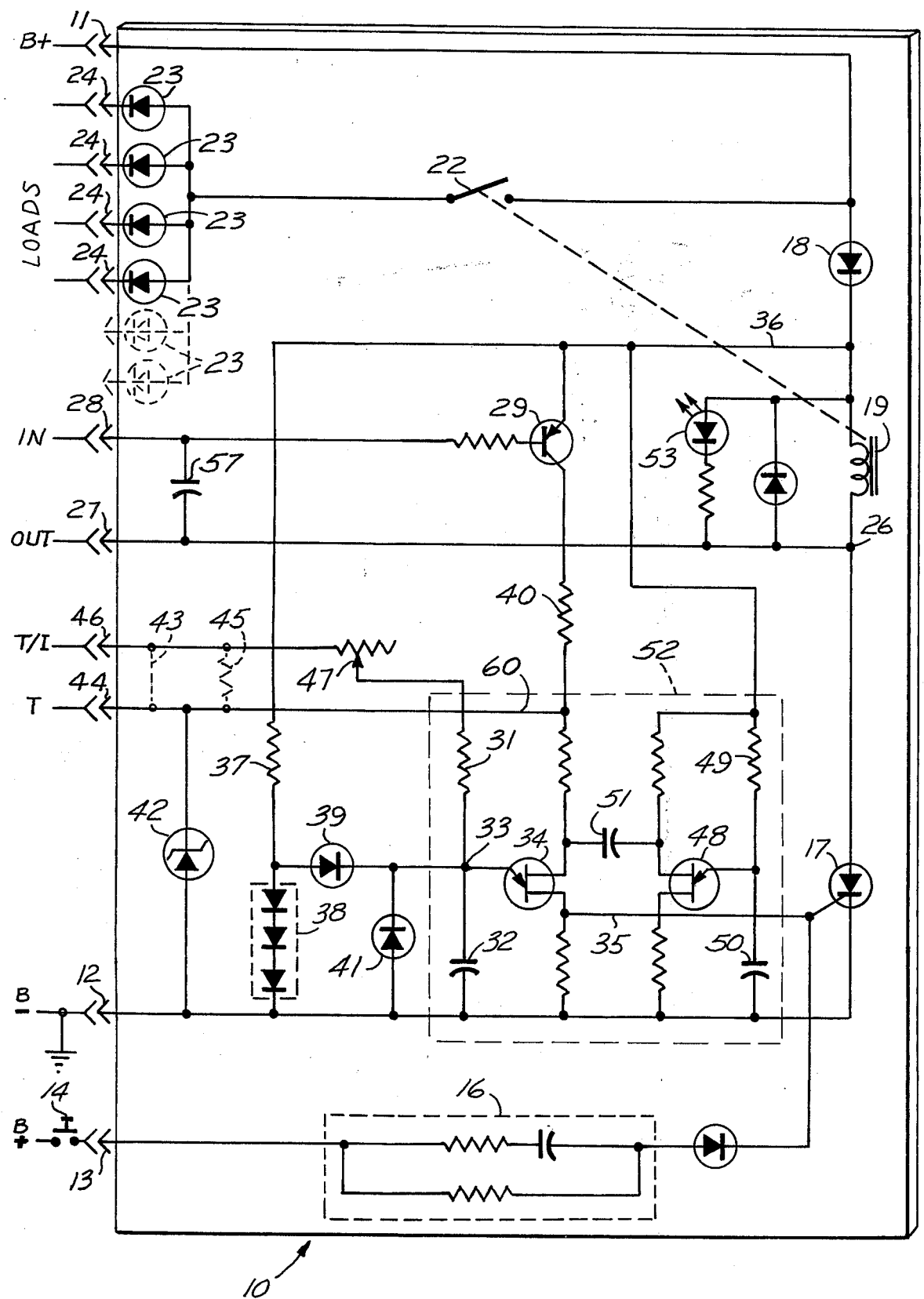
FIG. 1 is a schematic drawing of the circuitry used in the basic module of the present invention.

FIG. 1 shows a basic module 10, which may comprise a single plug-in circuit board; the circuitry of module 10 operates as follows. A power source (not shown) such as a battery that produces about 28 volts, has its positive pole connected to the module's positive power-terminal 11 — identified by a "B+;" and has its negative pole connected to the module's negative power terminal 12 — identified by "B−." Under most conditions, the module's negative power terminal 12 may be the ground terminal of the overall system.

One way to start the operation is by the use of a "manual" starting signal; although, as will become apparent later, the manual starting-signal may ofttimes be produced by suitable apparatus. In FIG. 1, it will be noted that starter terminal 13 — also identified by B+—is also connected to the positive pole of the power source — (or, alternatively, to the positive power terminal 11 of the module) through a start switch 14. When the starting switch 14 is closed, it produces a starting-signal that is applied through the shaping network 16 to a "firing" element 17. In the present case the firing element 17 is a Silicon Controlled Rectifier (SCR); and the starting-signal is applied to the gate-electrode of the SCR 17.

A SCR has the characteristic that when a suitable voltage is impressed across it, and a suitable signal is simultaneously applied to its gate-electrode, the SCR becomes conductive; and when conductive, no additional signal applied to the gate-electrode has any effect on the conductivity of the SCR. The SCR 17 of FIG. 1 now has such a favorable environment (i.e., a suitable battery voltage B+ to B− is impressed across it), and a suitable signal is simultaneously applied from B+ and network 16 to its gate-electrode. Therefore, SCR 17 becomes conductive and "fires" — thus completing the electrical circuit from the positive power-terminal 11 through a direction-control diode 18, through a relay field-coil 19, through the now-conductive SCR 17, through the negative power-terminal 12 of the module 10. Module 10 now assumes its ON or "fired" state.

As a result of the electric flow through the relay field-coil 19, the relay-contacts 22 close; and now electric power flows from the positive power terminal 11, through the now-closed relay-contacts 22, through the load-isolating diodes 23; and to the loads (not shown) connected to loadterminals 24. The load isolating diodes 23 act to isolate the various loads from each other, and to prevent cross-talk between them.

A mechanical relay is used in the otherwise electronic circuit for the following reason. Some of the loads may be of the type that produce arcing when they are turned off; and the relay contact 22 are inherently designed to withstand such arcing. If non-arcing loads are to be used, the relay may be replaced by a solid-state device; but this substitution might limit the uses of the disclosed module. Another advantage of using the meachnical relay is that the SCR 17 always "sees" the same load; a condition that might not exist if a solid-state device were substituted. Thus—as will be discussed later—when the mechanical relay is used, the circuit is relatively insensitive to loads; and the designer or user does not have to concern himself with electronic factors.

In this way, the loads connected to module 10 are energized when the module fires; and they remain energized as long as the module remains in its fired state.

As is known to those skilled in the art, before the SCR 17 fires, the pickoff point 26 — located between the bottom of the relay field-coil 19 and the anode of the SCR 17 — is at a relatively-high voltage, roughly 28 volts; but as soon as the SCR 17 fires, its conductivity and the flow of electric current causes the pickoff-point 26 to drop to a low voltage of about 1 volt — and to remain at this low voltage as long as the circuit of module 10 in ON. This approximately 27-volt drop in the voltage at the pickoff-point 26 is known as a negative-going signal; and, in the present case, becomes the output-signal of module 10—being presented to output signal-terminal 27, and remaining present for the duration of the firing state of the module.

When the circuit is turned OFF, in a manner that will be explained later, the low voltage at the pickoff-point 26 rises to its original 28 volt value; thus terminating the output-signal at the output terminal 27. The use of this output-signal will be discussed more fully later.

In summary, it may be stated that when the module 10 fires, it produces an output-signal, and simultaneously energizes any loads connected to the load-terminals of the module; and when the module turns OFF, the output-signal is terminated, and simultaneously any loads connected to the load terminals of the module are de-energized.

As indicated above, the module's operation may be started by means of a start-signal; and in many instances this is part of the normal operating procedure. Ordinarily, however, the module's operation is started by an initiating signal applied to the module's input-terminal 28. It will be noted that the input-terminal 28 is connected to a switching-transistor 29. A negative-going initiating-signal (to be discussed later) applied to input-signal terminal 28 causes the switching-transistor 29 to become conductive; switching transistor 29 acting in a manner of a closed switch that causes the module to eventually fire in the same manner as the starting signal discussed above.

Thus an initiating signal or a starting signal may be used to place the module in its firing state; the resulting energization of the loads, and the production of the output-signal being the same—regardless of how the operation of the module was begun.

FIG. 1 shows a timing circuit comprising, in part, a series-connected timing-resistor 31 and a timing-capacitor 32; and it is known that when a timing current flows through the timing circuit, the voltage at the timing-point 33 changes. By means to be explained later, an electric timing current is caused to flow through the series-connected timing-resistor 31 and timing-capacitor 32; this timing current gradually charges the timing-capacitor 32, thus gradually raising the voltage at the timing-point 33.

FIG. 1 shows that the timing circuit contains a timing-transistor 34, preferably of the uni-junction type — for a reason to be explained later. Timing-transistor 34, because of its inherent construction and the electric parameters (voltages, resistors, biases, etc.) used in the circuit, will become conductive when the voltage at timine-point 33, and thus at the gate-electrode of timing-transistor 34, reaches a predetermined value; whereupon the uni-junction-transistor characteristics causes timing-transister 34 to produce an abrupt positive-going pulse-like firing-signal. This firing-signal from tiining-transistor 34 is applied over wire 35 to the gate-electrode of the SCR 17; so that the timing-transistor fires the SCR 17 in the same manner as the previously-discussed starting-signal.

The following technique is used to provide improved performance by the timing transistor 34. It will be noted that when battery power is first applied to the positive power terminal 11, electricity immediately flows through directional-diode 18, and — in part — along a wire 36, through resistor 37, and through a set of series-connected diodes 38, back to the negative powerterminal 12. As electricity flows through the set 38 of diodes, these coact to produce a constant "reference" voltage across the set of diodes; and this constant reference voltage is applied through diode 39 to the gate-electrode of the timing-transistor 34. This reference voltage is low enough so that it does not, by itself, turn on the timing-transistor 34; but, being constant, the reference voltage acts as a constant base voltage for the timing-point 33.

When a positively-increasing voltage from the timing-capacitor 32 is added to the constant base voltage of timing-point 33, the two voltages combine to produce a positively-increasing timing-signal that is applied to the gate-electrode of the timing-transistor 34, to cause it to become conductive, and to produce the previously-described firing-signal.

Timing-transistor 34 provides the following improved performance. As soon as the timing-transistor 34 becomes conductive, it acts as a short-circuit across the timing-capacitor 32; and discharges the timing capacitor to the first reference voltage established by the set 38 of diodes. As a result, the timing-capacitor 32 always charges from a constant reference voltage; thus providing improved stability, reproducibility, and reliability.

This discharging action is quite rapid; and the timing-capacitor 32 is soon available to be charged again. As a result of the charging and discharging of the timing-capacitor 32, the timing-transistor 34 operates as a "free-running" oscillator that produces a train of firing-signals at a relatively-low repetition rate established primarily by the various parameters of its timing circuit.

Due to the fact that there may be a number of transient voltages that could effect the timing circuit and the timing-transistor 34, a protective diode 41 is used; this acting to bypass such transients to the negative power-terminal 12.

It was indicated above that the timing circuit produces a positively-increasing voltage that helps form a timing-signal for eventually connductivating the timing-transistor 34; and it will be realized that the timing circuit may inherently introduce a given delay-interval between the receipt of the initiating signal of input terminal 28 and the actual turning on of the timing-transistor 34. For example, a low reference-voltage applied to the timing-point 33 would produce a relatively long delay-interval before the timing-transistor 34 became conductive; also, a large timing-capacitor 32 would charge up slowly, and would also introduce a longer delay-interval; and similarly, a small timing current would also produce a longer delay-interval.

The present invention introduces a controllable delay interval; this result being accomplished by controling the timing current as follows. It will be noted that when the switch-transistor 29 becomes conductive, it permits electric current to flow through a resistor 40, over wire 60, and through a zener diode 42 to the negative power-terminal 12; the zener diode 42 having the characteristic that it produces, at its upper end, a second constant reference voltage. This second reference voltage is used as a constant voltage source for the timing current; and operates as follows. Where minimal delay is desired, an external jumper 43 (indicated by the dotted line) is connected between the timing-terminal 44 and the timing/inhibiting terminal 46; jumper 43 functioning in the following manner.

The second reference voltage produced by zener diode 42 produces a timing current that is transmitted through jumper 43, through a potentiometer or rheostat 47, through the timing-resistor 31 and the timing-capacitor 32 as explained above. The effective resistance of potentiometer 47 may be varied from zero resistance to its maximum resistance; at its zero resistance setting, this resistance has no effect on the timing current—and the timing circuit functions as discussed above, with minimal delay. At the potentiometer's maximum resistance setting, it introduces a change of overall timing resistance; so that the timing current is decreased, and the delay-interval is decreased. Moreover, since the potentiometer is variable, the overall timing resistance is also variable, and the use of suitable potentiometers permits the delay interval to be varied from about 0.05 seconds to about 5 seconds.

If an even longer delay interval is desired, jumper 43 is replaced by an even larger-valued resistance 45 (indicated by the dotted resistance line connected externally between terminals 44 and 46); and this arrangement will provide delays of up to an hour.

Thus, when the initiating-signal is applied, the circuit provides a controllable delay-interval; at the end of which the overall circuit assumes it operative state. In this way, there is a controllable delay-interval between the reception of an initiating-signal and the production of an output-signal.

The timing circuit, as thus far described, has the following disadvantage associated with long delay-intervals. It so happens that long delay-intervals require the use of high-valued timing-resistors; and these tend to introduce leakage and other deleterious effects that degrade the operation of the timing sequence for long-delay operations.

These deleterious effects may be overcome as follows. FIG. 1 shows a second unijunction transistor 48 connected in such a way that it is alway operating as a free-running oscillator; i.e., it is always connected to a source of power, and its timing circuit (timing resistor 49 and timing capacitor 50 coact to provide a timing-signal that causes the second unijunction transistor 48 to run continuously as a free-running oscillator that has a repetition-rate much higher than the repetition rate of the timing transistor 34. A train of negative-going pulses are obtained from the second unijunction transistor 48; and are transmitted by capacitor 51 to the timing-transistor 34.

Thus, whenever the gate electrode of the timing transistor 34 receives the previously discussed positive-going timing-signal from its timing circuit, it practically simultaneously receives a negative-going pulse at its base No. 2 electrode; and these two oppositely-poled signals coact to immediately turn on the timing-transistor 34—regardless of the length of the delay-interval.

Figure 3:
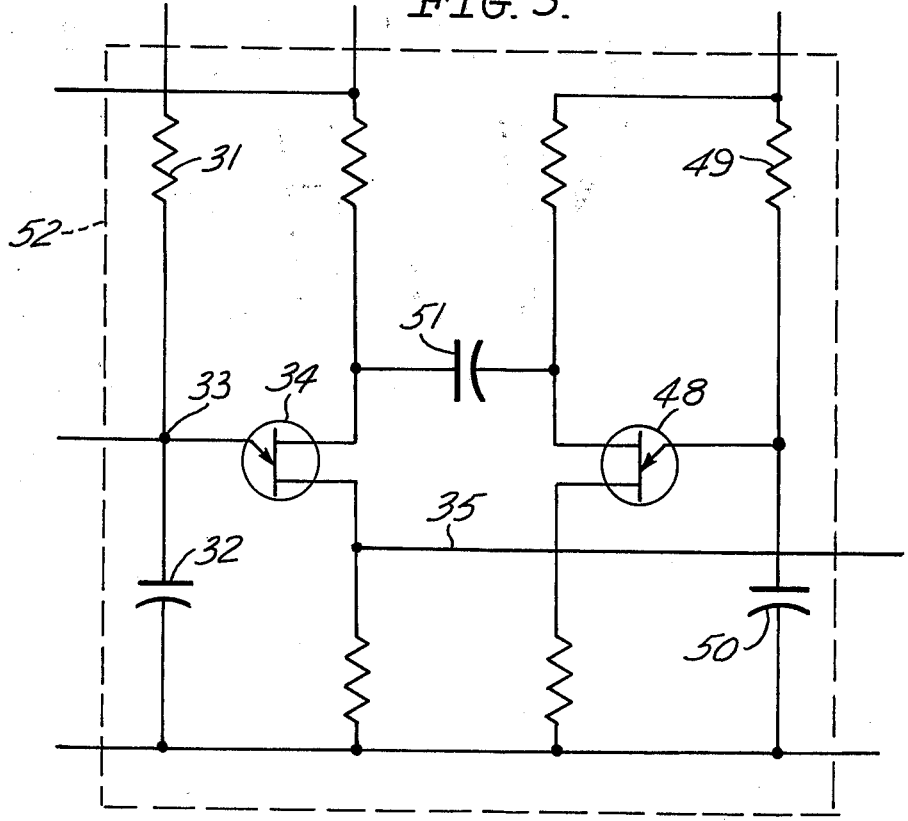
FIG. 3 shows an enlarged view of a portion of the circuitry of the basic module.

Thus, the relaxation oscillator arrangement 52—illustrated in an enlarged form in FIG. 3— increases the sensitivity of timing transistor 34, and improves the operation of the timing circuitry; especially for long delay intervals.

It was point out above that the timing-circuit functions by having a timing current flow from the second reference voltage established by zener-diode 42, through an external jumper 43 or an external resistor 48, through the timing-potentiometer 47 (if used), through the timing resistor 31, through the timing capacitor 32, to the negative power-terminal 12; the resultant timing current acting to charge the timing-capacitor 32, and to conductivate the timing-transistor 34 to produce a timing-signal that fires the circuit to its ON mode of operation. Under some conditions, it may be desirable to inhibit circuit operation; an inhibition sometimes being a desirable response to an emergency, and sometimes being a normal step in a series of operations.

Such an inhibiting operation may be achieved in the present circuit by connecting the timing/inhibiting terminal 46 to the negative power-termal 12; resulting in the following conditions. At this time, the top of the timing circuit, i.e., the top of the timing-resistor 31, —instead of being connected to a source of charging voltage produced by zener-diode 42—is connected instead to the negative power-terminal 12. As a result of this inhibiting connection, no timing current is produced. Therefore, the time-transistor 34 is never turned on; and the circuit remains in its OFF non-conductive state. This holding or inhibiting operation may be terminated by disconnecting the timing/inhibiting terminal 46 from the negative power-terminal 12; by including a suitable switch in the inhibiting connection, the overall holding operating may be controlled manually, may be controlled by a remotely actuated switch, or the like.

It should be noted that such an inhibiting operation prevents the module from firing; so that no output-signal is produced. Approaching this from another point of view, the inhibiting operation may be considered as disabling the timing circuit, or as introducing an infinitely-long delay-interval.

When the module 10 is ON, electric current flows from diode 18 through a light-emitting diode (LED) 53 which glows to act as a pilot light to show that the module is operating; the LED being extinguished to show that the module is OFF.

The assignment of designing a sequencing system is enough to throw fear into the heart of the average engineer; but the present invention practically permits a novice to do so. The first step is to determine how many different stages of operation are desired. For example, one stage may consist of turning on a given number of loads for a given time interval; the next stage may consist of turning on a different combination of loads for a different time interval; the next stage may consist of turning off all loads for a given interval of time; the next stage may consist of turning on a still different combination of loads for a still different time interval, etc.; after which the sequence of stages is to be repeated, either automatically, semi-automatically, or at the option of the operator.

Figure 2:
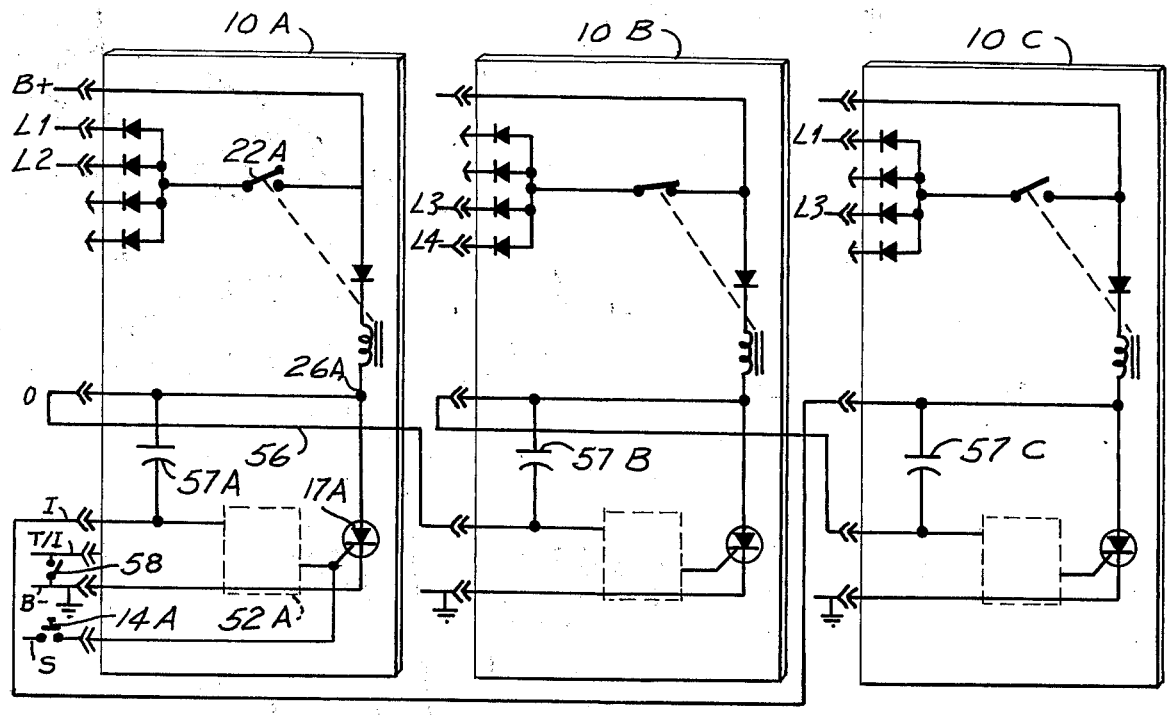
FIG. 2 shows how the basic modules are interconnected to form the sequencing system.

The designer, having first determined the number of stages required, selects that number of identical modules corresponding to the module of FIG. 1; and plugs these identical modules into connection circuitry, exemplified in FIG. 2. This illustration shows a plurality, three, of identical modules 10A, 10B, and 10C, of the type discussed above; but, as indicated previously, any desired number of such modules may be used.

It should be noted that the connection circuitry illustrated in FIG. 2 connects the output-terminal "O" of each module to the input-terminal "I" of its "subsequent" module; in this way forming a "set" of modules—which set may however have a "first" module 10A and a "last" module 10C. FIG. 2 illustrates a particular connection circuitry wherein the third module, 10C, has the first module, 10A, as its subsequent module; and the first module, 10A, has the third module, 10C, as its preceding module.

Mode of Operation

To start the operation of the sequencing system, one module—say 10A, the first module—is started manually as described above. As soon as the electric current flows through the SCR 17A of the first module 10A, module 10A fires; and the fired state of module 10A causes the relay-contacts 22A to close, any loads such as L1 and L2 connected to selected load-terminals of module 10A are thus energized. The loading arrangement will be discussed more fully later.

Simultaneously with the firing of the first module 10A, its negative-going output-signal is applied from its output-terminal O through wire 56 to the input terminal I of the second module 10B; and here it becomes the negative-going initiating-signal that eventually causes the second module 10B to fire in the manner previously discussed. Thus, as the first module 10A turns on, its output-signal activates its subsequent module 10B, which thereupon undergoes its delay-interval; and eventually turns on, producing its own output-signal.

Attention is now directed to the instant at which the second module 10B has completed its delay-interval. At this instant, it assumes its firing state; and produces its output-signal. At this same instant, module 10B's subsequent module 10C is still off, having just received an initiating-signal in the form of an output-signal from the second module 10B; and is beginning its delay-interval.

At this same instant, module 10B's preceding module 10A is still on; having been in its firing state, and producing its output-signal, for the duration of the delay-interval of the second module 10B. Thus, at the instant that a selected module fires, it is ON, its subsequent module is OFF, and its preceding module is still ON.

A slight digression is now desirable in order to more fully understand the operation of the SCR. Turning again to FIG. 2, it will be seen that output terminal O of each module is coupled, through respective coupling capacitors 57A, 57B and 57C, to the output-terminal O of the preceding module. As a result of this coupling, the negative-going output-signal from the second module 10B is applied through coupling capacitor 57B to the output-terminal O of its preceding module 10A; so that the coupled output-signal is impressed onto the pickoff-point 26A of the preceding module 10A.

The result of this coupled output-signal may be understood by referring again to FIG. 2. It will be recalled that SCR 17A remained conductive because a required voltage is impressed across it; i.e., its cathode is connected, to the zero voltage at the negative power-terminal B—, and its anode is connected to the take-off point 26A, which has a voltage of about 1 volt. Thus, there is about 1 volt across SCR 17A; and it therefore remains conductive. If this voltage across SCR 17A were to be removed, the SCR 17A would become non-conductive; and would require both its firing-voltage and a starting-signal to fire again, as discussed above.

It was pointed out above, that the negative-going output-signal from the output-terminal of module 10B has a value of about 27 volts; and is coupled to the pickoff-point 26A of the first module 10A. As shown in FIG. 2, this means that for the duration of the coupled output-signal (which may be quite short due to the action of capacitor 57B), the voltage at pickoff-point 26A is reduced to about 25 volts below B—; meaning that, for this duration of the coupled output-signal, there is no effective voltage across SCR 17A. As a result SCR 17A becomes non-conductive; and the circuit of module 10A is broken, to turn off—or extinguish—the module 10A. Thus, as the second module 10B fires, it automatically extinguishes its preceding module 10A. Module 10B is therefore the only module to be firing or ON.

To summarize, when any given module fires, it activates its subsequent module, and turns off its preceding module. In this way, only a single module is ON at any given time. Thus, the modules of the overall circuit fire in sequence; and the ON mode "steps" to each module in the series, at a rate determined by the delay-settings of the various modules. It should also be noted that each module is ON for a time-interval corresponding to the delay-interval of its subsequent module; since, when its subsequent module goes ON, that resultant output-signal extinguishes its preceding module. In this way, an automatic cycling is produced for every module of the series.

As indicated previously, an inhibiting connection will prevent a module from being turned ON by the initiating-signal from its preceding module. Thus, if a given module—say 10A—has its inhibiting terminal T/I connected to the B-terminal, the sequencing of the series will be interrupted when module 10A would ordinarily fire; and its preceding module (10C in this case) will remain in its firing state, since there is no signal from its subsequent module 10A for turning module 10C OFF.

Thus, for example, an inhibiting connection comprising a switch 58 associated with module 10A, can hold the loads of module 10C in a continuously energized mode of operation; until switch 58 is opened. The function of opening of switch 58—which thus terminates the holding operation—may be a manual operation, may be part of a process or a measurement, may be linked to the start-button, etc.

A semi-automatic operation may be achieved by means such as the use of inhibiting switch 58 of module 10A; and in this case, the system will assume a holding operation, and stops its cycling with the preceding module 10C held in its firing mode. Once switch 58 is opened, the sequencing may be started by actuating the starting switch 14A.

It may be advantageous to include an extra module in this series, so that the last module—which maintains its firing state as a result of the inhibiting operation of the first module—may have a lamp as its only load. In this way, the lighted "ready" lamp will indicate the existence of the inhibiting mode of operation and the readiness of the circuit to resume its cycling.

Thus, by having the inhibiting switch 58 either open or closed, the overall operation may be either automatic or semi-automatic. The semi-automatic mode may be achieved by manually closing switch 58; by having switch 58 take the form of a solenoid-actuated switch that is connected as a load of module 10B; etc.,—so what when the module 10B fires, it closes the inhibiting switch 58; and this causes the semi-automatic mode of operation.

It was previously indicated that given loads are connected to particular load terminals "L;" and the present invention premits the following typical load arrangement. First module 10a, indicated in FIG. 2, has loads L1 and L2 connected to it; so that when the first module 10A fires, loads L1 and L2 are energized for the duration of the time-delay of the subsequent module 10B. When the second module 10B fires, it turns off the preceding module, and de-energizes loads L1 and L2; and turns on loads L3 and L4 connected to the load terminals of the second module 10B. Loads L3 and L4 are thus energized for the duration of the delay-interval of the third module 10C. When the third module 10C fires, it turns off the preceding module and de-energizes loads L3 and L4; and turns on loads L1 and L3 connected to the load terminals of the third module. Loads L1 and L3 are thus energized for the duration of the delay-interval of the first module 10B.

It should be noted that each load is either connected or unconnected to the load terminals of the various modules. For example, load L1 is shown to be connected to modules 10A and 10C; so that load L1 is first energized, then de-energized, and then energized again. On the other hand, load L3 is first de-energized, than continuously energized for two stages. The isolating diodes 23 practically eliminate cross-talk.

Thus, any desired combination of loads may be energized in any desired sequence; and each load may be energized and de-energized for as long an interval as desired.

Maintenance of the disclosed sequencer is minimal; as the system is built of high-quality parts that have high reliability and long life. Trouble-shooting—when necessary—consists primarily of determining which module is inoperative; and then unplugging it, and replacing it with another identical module. Since all of the modules are identical and interchangeable, inventory is minimal—one spare module being satisfactory.

In some cases it may be unsafe to manually stop the machines or processes wherever they happen to be at that time. In such cases, a panic button may be used as the inhibiting connection for any module that produces an operational state at which it is safe to stop the machines or processes.

In other instances, it may be desirable to have a "deadman" control arrangement. This is an arrangement in which the operator must keep one or two switches depressed in order for the system to work. Should the operator remove either hand from the deadman switches, the sequencing stops.

This result can be achieved by having an inhibiting connection comprise one—or two—normally-closed inhibiting switches (such as switch 58 discussed above) that are held open by hand pressure. As soon as the operator's hand pressure is released, the deadman switch operates as an inhibiting connection to shut down the apparatus.

As indicated previously, each module has its own LED pilot light to indicate when it is in its firing state; and it is frequently desired to plan the system so that the last module is an extra one and lights a ready lamp so the operator will be informed that the sequence is ready to start. This arrangement was another advantage that may be particularly desirable in the case of starting up after a power failure. In such a case, it is often desirable for the supervisor the check the equipment and assure himself that everything is in proper order for a start.

To provide such supervision, it should be recalled that in case of a power failure and subsequent power restoration, each module will assume its "stand-by" state; awaiting a start-signal. In order to prevent an unauthorized start, the supervisory circuit may be wired as a starting circuit for the last, or ready, module of the set of modules. The first module of the set has an inhibiting connection comprising a switch that closes on the occurance of a power failure; thus establishing a holding circuit. The starting-signal of the first module obtains operating power—not from the power source, but from the last or ready module. Therefore, the supervisory circuit activates the last or ready module, which is held in its firing state by the hold-connection of the first module. Now, the operator's start-button may be used to break the inhibiting connection, and to fire the first module. Thus, after power restoration, the supervisory switch may be closed only by means such as a key-operated supervisory control. In this way, the sequencing system remains inoperative after a power failure and restoration; but may be enabled for normal use by the supervisory key-operated control.

The present invention has many advantages over prior art sequencing arrangements. First of all, a relatively inexperienced person may design a relatively complex sequencing system. Second, the system uses a plurality of identical modules. Third, since all of the modules are identical, they may be easily interchanged for use in new sequencing systesm. Fourth, it is easy to modify the system to meet new requirements. Fifth, since all the modules are identical, inventory is minimal. Sixth, the modules are economical. Seventh, trouble-shooting does not require any particular expertise. Eighth, repair and maintenance is easy. Ninth, the overall system is extremely stable, reliable and long-lived. Tenth, the sequencing system may be automatic, semi-automatic, or manual. Eleventh, panic buttons may be easily incorporated. Twelfth, dead-man controls may be readily added. Thirteenth, supervisory control may be inserted for start-up after power loss and power restoration. And, finally, the system is extremely flexible.

I claim:

1. Apparatus for energizing selected loads in a predetermined sequence and at predetermined intervals of time, comprising:
   a plurality of identical electronic modules, each of said modules having an input terminal, an output terminal, and a plurality of load terminals;
   means, comprising an electrical connection, for electrically connecting the output terminal of each of said modules to the input terminal of a responsive subsequent module, whereby said modules are joined together in a closed loop circuit, in which each module has a preceding module and a subsequent module;
   means, comprising an electrical coupling, for electrically coupling said output terminal of each of said modules to the output terminal of its preceding modules;
   means for causing the firing of a selected module to energize said load terminals of that module and produce an output signal at said output terminal;
   said electrical coupling being operable to cause said output signal of said selected module to extinguish the module preceding the selected module;
   said electrical connection being operable to cause said output signal to activate the module subsequent to said selected module;
   whereby each module of said set fires in sequence, and this firing mode steps through the modules of the series.

2. The invention of claim 1, including means for connecting given combinations of loads to various load terminals of said modules;
   means for energizing associated combinations of said loads when each said module assumes its firing state;
   said combinations of loads remaining energized for the duration of the firing state of associated modules.

3. The invention of claim 1, including means for causing one of said modules to maintain its firing state.

4. The invention of claim 1, inlcuding means for introducing an individually controlled delay interval into each of said modules.

5. The invention of claim 4, including means for producing a semi-automatic operation of said apparatus; said semi-automatic operation comprising switch means for introducing an infinitely-long delay interval.

6. The invention of claim 1, including panic button means for terminating the sequencing operation of the subject apparatus.

7. The invention of claim 1, including supervisory buttom means for enabling the sequencing of said apparatus in case of a power shutdown.

8. Apparatus for energizing selected loads in a predetermined sequence, and for predetermined intervals of time, comprising:
   a plurality of identical electrical modules, each said module having an input terminal, an output terminal, and a plurality of load terminals;
   means, comprising an electrical connection, for electrically connecting the output terminal of each of said modules to the input terminal of its subsequent module, whereby said modules are joined together in a closed loop circuit, in which each module has a preceding module and a subsequent module;
   means, comprising an electrical coupling, for electrically coupling said output terminal of each of said modules to said the output terminal of its preceding module;
   means for applying a starting signal to at least one selected module of said set of modules;
   means for causing said starting signal to fire said selected module;
   means for applying initiating signals to said modules of said set of modules means on each of said modules for producing an output signal when the module is fired, said output signal being transmitted to the output terminal of that module and thence to the input terminal of the subsequent module;
   timer means connected to the input terminal of each module and activated by said output signal received from the preceding module for introducing an individually controllable delay interval between the application of said output signal and the firing of the associated module;
   means actuated by said timer means for causing the firing of a module to produce an output signal at the output terminal of said fired module;
   said electrical coupling, being operable to cause said output signal to extinguish the module preceding said fired module; and
   said electrical connection being operable to cause said output signal to activate said timer means of the module subsequent to said fired module;
   said fired module remaining in its firing state for the duration of the delay interval of its subsequent module;
   whereby each module fires in sequence, and the firing mode steps through the modules of the series at a reate determined by the delay setting of the various modules.

9. The invention of claim 8 including means for causing one of the modules to maintain its firing state.

10. The invention of claim 9, including means for producing a semi-automatic operation of said apparatus, said semi-automatic operation comprising one module having an inhibiting connection having a switch therein.

11. The invention of claim 9, including panic button means for terminating the operation of said apparatus; said panic button means comprising means for maintaining a given module in its firing state, said firing state of said module being determined to be the safest step at which to stop the sequence of said apparatus.

12. The invention of claim 8, including supervisory button means for enabling the sequence of said apparatus after a powder shutdown;

said supervisory button means comprising means for enabling the starting circuit of a given module.

13. The invention of claim 8, including means for selectively connecting given electric loads to particular load terminals of various modules of said set of modules;

means for energizing the loads connected to the load terminals of said modules when each of said modules firing;

whereby selected loads are energized in a predetermined sequence, and for predetermined time intervals.

* * * * *